US011409663B2

United States Patent
Campbell et al.

(10) Patent No.: US 11,409,663 B2
(45) Date of Patent: *Aug. 9, 2022

(54) METHODS AND SYSTEMS FOR OPTIMIZED TRANSLATION OF A VIRTUAL ADDRESS HAVING MULTIPLE VIRTUAL ADDRESS PORTIONS USING MULTIPLE TRANSLATION LOOKASIDE BUFFER (TLB) ARRAYS FOR VARIABLE PAGE SIZES

(71) Applicant: International Business Machines Corporation, Armonk, NY (US)

(72) Inventors: David Campbell, Austin, TX (US); Dwain A. Hicks, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/089,324

(22) Filed: Nov. 4, 2020

(65) Prior Publication Data
US 2021/0049107 A1  Feb. 18, 2021

Related U.S. Application Data

(63) Continuation of application No. 16/173,397, filed on Oct. 29, 2018, now Pat. No. 10,915,459.

(51) Int. Cl.
*G06F 12/1009*  (2016.01)
*G06F 12/1045*  (2016.01)
*G06F 12/0893*  (2016.01)

(52) U.S. Cl.
CPC ...... *G06F 12/1054* (2013.01); *G06F 12/0893* (2013.01); *G06F 12/1009* (2013.01)

(58) Field of Classification Search
CPC ............ G06F 12/1054; G06F 12/0893; G06F 12/1009; G06F 2212/652; G06F 2212/68; G06F 12/1027
(Continued)

(56) References Cited

U.S. PATENT DOCUMENTS

| 5,375,214 A | 12/1994 | Mirza et al. |
| 7,895,410 B1 | 2/2011 | Wu |

(Continued)

OTHER PUBLICATIONS

List of IBM Patents or Patent Applications Treated as Related, dated Nov. 4, 2020, 2 pages.

*Primary Examiner* — Hong C Kim
(74) *Attorney, Agent, or Firm* — Scully, Scott, Murphy & Presser, P.C.

(57) ABSTRACT

A computer system includes a translation lookaside buffer (TLB) and a processor. The TLB comprises a first TLB array and a second TLB array, and stores entries comprising virtual address information and corresponding real address information. The processor is configured to receive a first virtual address for translation, and to concurrently determine if the TLB stores a physical address associated with the first virtual address based on a first portion and a second portion of the first virtual address. The first portion is associated with a first page size and the second portion is associated with a second page size (different from the first page size). The first portion is used to perform lookup in either one of the first TLB array and the second TLB array and the second portion is used for performing lookup in other one of the first TLB array and the second TLB array.

20 Claims, 8 Drawing Sheets

(58) Field of Classification Search
USPC .................. 711/207, 212, 172, 128, 118
See application file for complete search history.

(56) References Cited

U.S. PATENT DOCUMENTS

| | | |
|---|---|---|
| 8,156,309 B2 | 4/2012 | Steiss |
| 2005/0273574 A1 | 12/2005 | Lin |
| 2010/0228944 A1 | 9/2010 | Bassett et al. |
| 2013/0238875 A1 | 9/2013 | Ramaraju et al. |
| 2016/0342523 A1 | 11/2016 | Rozario et al. |
| 2016/0357482 A1 | 12/2016 | Duluk, Jr. et al. |
| 2017/0262381 A1 | 9/2017 | Swaine |
| 2017/0371799 A1 | 12/2017 | Mukherjee et al. |
| 2018/0046583 A1 | 2/2018 | Bybell et al. |
| 2018/0181496 A1 | 6/2018 | King et al. |
| 2018/0203806 A1 | 7/2018 | Moudgill et al. |
| 2018/0232316 A1 | 8/2018 | Mirza et al. |
| 2018/0307617 A1* | 10/2018 | Harris ................. G06F 12/1009 |
| 2019/0213140 A1 | 7/2019 | Cooray et al. |
| 2020/0183856 A1* | 6/2020 | Campbell ........... G06F 12/1018 |

\* cited by examiner

METHODS AND SYSTEMS FOR OPTIMIZED TRANSLATION OF A VIRTUAL ADDRESS HAVING MULTIPLE VIRTUAL ADDRESS PORTIONS USING MULTIPLE TRANSLATION LOOKASIDE BUFFER (TLB) ARRAYS FOR VARIABLE PAGE SIZES

BACKGROUND

The disclosure herein relates generally to data processing, and more particularly, to methods, apparatus, and products for optimizing lookups in a translation lookaside buffer (TLB) in a computer system.

Memory management, i.e., the operations that occur in managing the data stored in a computer, is often a key factor in overall system performance for a computer. Among other tasks, memory management oversees the retrieval and storage of data on a computer, as well as manages certain security tasks for a computer by imposing restrictions on what users and computer programs are permitted to access.

Modern computers typically rely on a memory management technique known as virtual memory management to increase performance and provide greater flexibility in computers and the underlying architectural designs upon which they are premised.

With a virtual memory system, the underlying hardware implementing the memory system of a computer is effectively hidden from the software of the computer. A relatively large virtual memory space, e.g., 64-bits or more in width, is defined for such a computer, with computer programs that execute on the computer accessing the memory system using virtual addresses pointing to locations in the virtual memory space. The physical memory devices in the computer, however, are accessed via "real" addresses that map directly into specific memory locations in the physical memory devices. Hardware and/or software in the computer are provided to perform "address translation" to map the real memory addresses of the physical memory to virtual addresses in the virtual memory space. As such, whenever a computer program on a computer attempts to access memory using a virtual address, the computer translates the virtual address into a corresponding real address so that the access can be made to the appropriate location in the appropriate physical device mapped to the virtual address.

One feature of virtual addressing is that it not necessary for a computer to include storage for the entire virtual memory space in the physical memory devices in the computer's main memory. Instead, lower levels of storage, such as disk drives and other mass storage devices, may be used as supplemental storage, with memory addresses grouped into "pages" that are swapped between the main memory and supplemental storage as needed ("paging"). When the processing system uses paging, the low order bits of the virtual address are preserved and used directly as the low order bits of the actual physical address. In contrast, the high order bits may be treated as a key or index to one or more address translation tables that correspond to a range of consecutive physical addresses. The memory referenced by such a range may be called a page. Page sizes may range in size, for example, from 512 bytes through 8 megabytes. In addition, some computer designs also include the concept of segmentation, which partitions the virtual memory into different segments (each mapped to blocks of pages) in order to facilitate memory protection, simplify the handling of large and growing data structures, and otherwise provide greater flexibility for performing memory management when multiple processes are capable of being handled in a computer at any given time. When segmentation is used, an additional layer of indirection is used, requiring an additional translation to be performed. Typically, in systems incorporating segmentation and paging, computer programs access the memory system using "effective" addresses that map to virtual addresses, thus requiring a translation first from effective to virtual address, then from virtual address to real address.

Due to the frequency of access requests in a computer, address translation can have a significant impact on overall system performance. As such, it is desirable to minimize the processing overhead associated with the critical timing path within which address translation is performed.

Address translation in a virtual memory system typically incorporates accessing various address translation data structures. One such structure, referred to as a page table, includes multiple entries that map virtual addresses to real addresses on a page-by-page basis. Likewise, for handling segmentation, a segment table is often provided, including entries that map effective addresses to virtual addresses on a segment-by-segment basis.

Often, due to the large number of memory accesses that constantly occur in a computer, the number of entries required to map all of the memory address space in use by a computer can be significant, and requires the entries to be stored in main storage, rather than in dedicated memory, which makes accessing such entries prohibitively slow. To accelerate address translation with such a scheme, high speed memories referred to as translation lookaside buffers (TLB) are typically used to cache recently-used entries for quick access by the computer. If a required entry is not stored in a TLB, a performance penalty is incurred in loading the entry from main storage; however, typically the hit rate on TLBs is exceptionally high, and the penalty associated with loading entries from main storage is more than offset by the performance gains when entries are immediately accessible from the TLB.

Originally, paging was based on fixed page sizes, e.g., 4 KB or 4096 addressable locations per page. With the use of segmentation, however, different page sizes may be supported in different segments. Smaller page sizes are often optimal for efficient use of a memory system, particularly when many processes are running concurrently in a computer. However, as the memory requirements of computers and the programs running thereon continue to increase, the number of pages of memory required by any given process or program continues to increase, and as a result, larger page sizes may be more efficient for many situations.

Some conventional address translation schemes have handled larger page sizes by allocating multiple entries in the TLB and page table for each large page, e.g., for a 16 KB page in a system that supports a minimum page size of 4 KB, four (16 KB/4 KB) entries may be used. However, for larger pages, the number of entries required to represent such pages can effectively reduce the capacity of TLBs, and thus lead to higher miss rates and lower performance.

Other designs allocate a single page table entry to each page regardless of size, and typically provide in the entry, or in the segment information for the segment within which the associated page is resident, an indication of the page size for that entry.

Multiple page sizes complicate address translation predominantly due to the different allocation of bits in effective addresses directed to different page sizes. In particular, addresses are often partitioned for the purposes of address translation into offset bits and index bits, with the offset bits pointing to a specific address in a page. For a 4 KB page, 12 offset bits are required to address every location in a page, while for a 16K page, 14 offset bits are required. The index bits, which are typically the higher order bits from the offset bits, are then used to identify the page, and thus, the index bits are used to access address translation data structures.

When multiple page sizes are supported, however, the size of a page must be known before the appropriate translation data structure can be accessed, so the proper bits can be used as the index into the structure. As such, when running a system with multiple page sizes, the TLB must be checked for all possible page sizes. This leads to a decrease in the TLB lookup speed. For example, when running a system with 4 KB, 64 KB, 24 MB, and 1 GB page sizes, each page size must be checked at the TLB before a full "TLB-miss" can be established (i.e., 4 cycles of TLB usage for one translation). Not only does this reduce the peak TLB bandwidth, but also reduces the latency to start a tablewalk and/or TLB hit latency for latter page sizes in the TLB lookup.

Certain systems solve the above issues by deploying multiple read ports on the TLB array for each page size. However, such a hardware solution is costly from a circuit standpoint and is not an effective solution. Certain other systems allocate one TLB array for each page size which leads to wastage in memory space and power.

SUMMARY

The summary of the disclosure is given to aid understanding of a computer system, computer architectural structure, processor, and method of promoting Effective to Real Address Translation entries in a computer system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

According to an embodiment of the present disclosure, a method for processing information in a processor of a computer system that includes a translation lookaside buffer (TLB) data cache and the processor is disclosed. The TLB may include a first TLB array and a second TLB array, and may be configured to store entries comprising virtual address information and corresponding real address information. The processor may be configured to receive a first virtual address for translation, and to concurrently determine if the TLB stores a physical address associated with the first virtual address based on a first portion and a second portion of the first virtual address. The first portion may be associated with a first page size and the second portion may be associated with a second page size (different from the first page size). In an embodiment, the first portion may be used to perform lookup in either one of the first TLB array and the second TLB array, and the second portion may be used for performing lookup in other one of the first TLB array and the second TLB array.

In an embodiment, the method may also include configuring the TLB data cache to include the first TLB array and the second TLB array before receiving the first virtual address, identifying a least significant bit (LSB) of effective address bits extracted from a virtual address, and defining a rule set for associating the first page size with the first TLB array or the second TLB array and for associating the second page size with the first TLB array or the second TLB array during translation based on a value of the LSB in a received virtual address. Optionally, the effective address bits are extracted based on a page size of a larger of the first page size and the second page size. Additionally, the method may include determining the value of the LSB in the received first virtual address. The system may then use the defined rule set for associating the first page size with either the first TLB array or the second TLB array and associating the second page size with the other one of the first TLB array or the second TLB array based on the value of the LSB in the first virtual address before the concurrent determination step. Optionally, the method may also include configuring the first TLB array and the second TLB array for using a portion of the first virtual address for performing a lookup based on a size of the associated page.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of a computer system, computer architectural structure, processor, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, assemblies, systems, circuitry, embodiments, or devices shown, and the arrangements, structures, subassemblies, features, aspects, methods, processes, circuitry, embodiments, and devices shown may be used singularly or in combination with other arrangements, structures, assemblies, subassemblies, systems, features, aspects, circuitry, embodiments, methods and devices.

DETAILED DESCRIPTION

Figure 1:
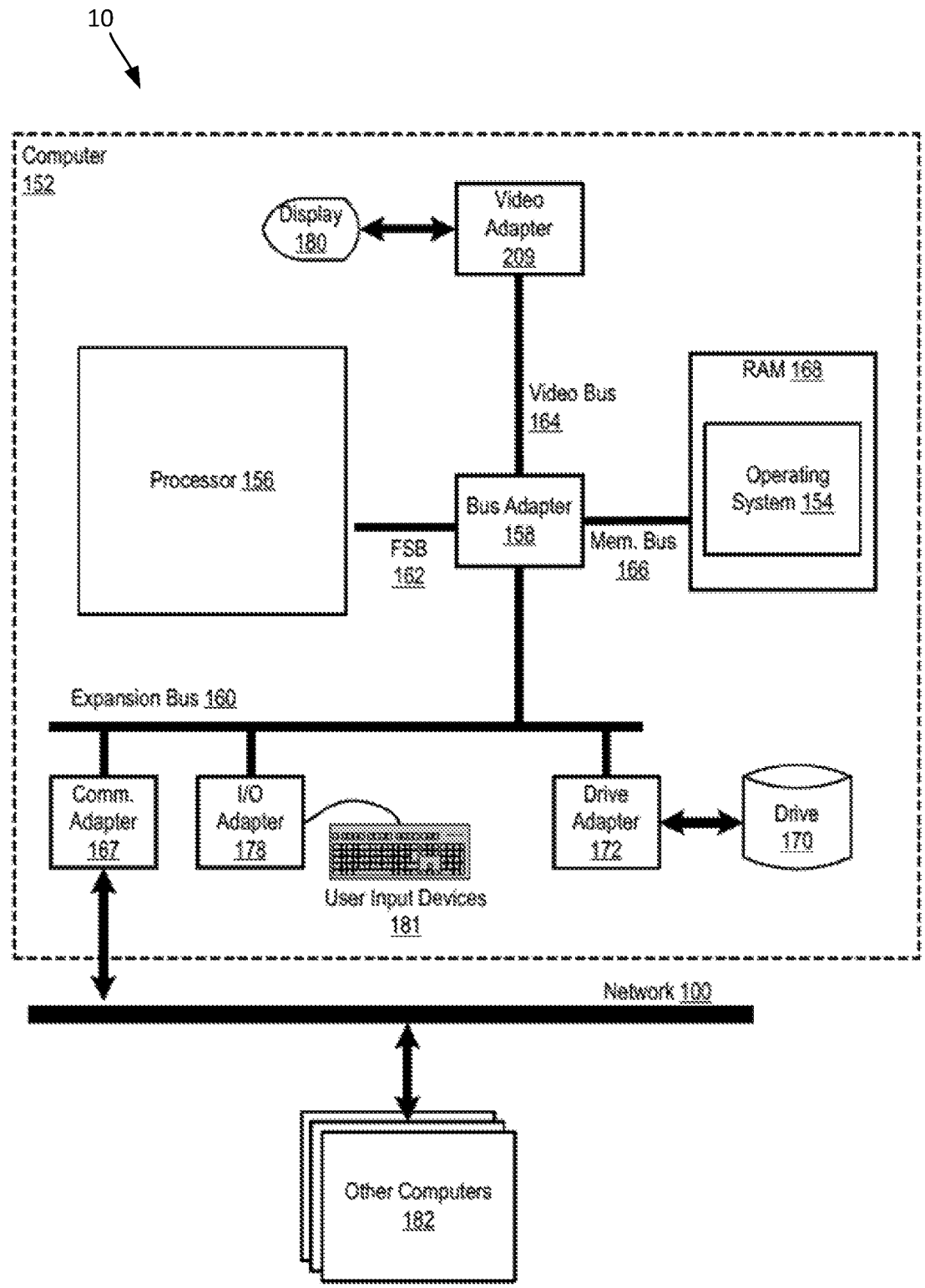
FIG. 1 is a functional block diagram illustrating a computer system, according to embodiments of the present disclosure.

The following description is made for illustrating the general principles of the invention and is not meant to limit the inventive concepts claimed herein. In the following detailed description, numerous details are set forth in order to provide an understanding of the computer system, computer architectural structure, processor, and their method of operation, however, it will be understood by those skilled in the art that different and numerous embodiments of the computer system, computer architectural structure, processor, and their method of operation may be practiced without those specific details, and the claims and disclosure should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes conventional features of information processing systems, including processors and microprocessor systems and architectures, which are apparent to those skilled in the art. It is assumed that those skilled in the art are familiar with the general architecture of processors, and in particular with processors which operate in an out-of-order execution fashion. It may be noted that a numbered element is numbered according to the figure in which the element is introduced, and is typically referred to by that number throughout succeeding figures.

A virtual address is translated into a corresponding physical address using a Translation Lookaside Buffer (TLB). TLB is a data structure that used for caching some of the mappings between the addresses in a given virtual address space and addresses in a given physical address space.

A page table maps virtual addresses to real addresses on a page-by-page basis and includes one or more page table entries (PTEs). A PTE represents a page of data residing in physical memory. Some but not all of the pages having corresponding page table entries in a page table are represented in a TLB. Finding a mapping or match in a given TLB between a virtual address and a physical address indicates that the page is available in the physical memory. Not finding a mapping or match in a given TLB between a virtual address and a physical address does not exclude a possibility that the page could be available in the physical memory, and the page table should be additionally checked before a definitive answer can be had about the existence of the page in the physical memory. Small pages and large pages can co-exist in a given memory. For accommodating and addressing a given amount of data, one needs fewer large pages than small pages. Accordingly, a smaller number of large pages have to be addressed as compared to the number of small pages in a given memory.

Frames of up to a threshold size, such as, for example, 4 KB, are called small frames or small pages. Frames of size larger than the threshold size, such as larger than 4 KB, are called large frames or large pages. For example, some presently available data processing systems allow frames of 16 MB, which are 4096 times larger than the 4 KB small frames. In such an example case, 4 KB can be regarded as the threshold size, 4 KB frames are accordingly regarded as small frames, and 16 MB frames are regarded as large frames.

The illustrative embodiments recognize that a large page can be regarded as comprising several small pages arranged contiguously. For example, a large page of 16 KB can be thought of as four small pages of 4 KB each arranged contiguously. Similarly, an exemplary 64 KB large page comprises sixteen parts, each a 4 KB small page in this example, arranged contiguously. Only for the clarity of the description, example sizes of 4 KB and 16 KB and 64 KB are used as examples. Furthermore, an example 64-bit addressing is used as an example for the clarity of the description and not as a limitation on the illustrative embodiments. An embodiment can be practiced with an addressing system of any size in a manner described herein and is contemplated within the scope of the illustrative embodiments.

FIG. 1 is a functional block diagram illustrating a computer system 10. The system 10 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152.

The processor 156 may be implemented as a multi-slice processor. The term "multi-slice" may refer to a processor having a plurality of similar or identical sets of components, in which each set of components may operate independently of all the other sets or in concert with the one or more of the other sets.

Although the processor 156 is shown to be coupled to RAM 168 through the front side bus 162, the bus adapter 158, and the high speed memory bus 166, those of ordinary skill in the art will recognize that such configuration is only an exemplary implementation and other configurations of coupling the processor 156 to other components of the system 10 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCie") connections and the like.

An operating system 154 may be stored in RAM 168 of the computer 152. Operating systems, useful in computers configured for operation of a processor, may include UNIX™, Linux™, Microsoft Windows™, AIX™, IBM's z/OS™, and others known to those of ordinary skill in the art. In addition to the operating system 154 being located in RAM 168, other components of such as data processing applications may be stored in the RAM 168. Furthermore, software and other components may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 109, which is an example of an I/O adapter specially designed for graphic output to a display device 180, such as a display screen or computer monitor. Video adapter 109 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 100. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

Figure 2:
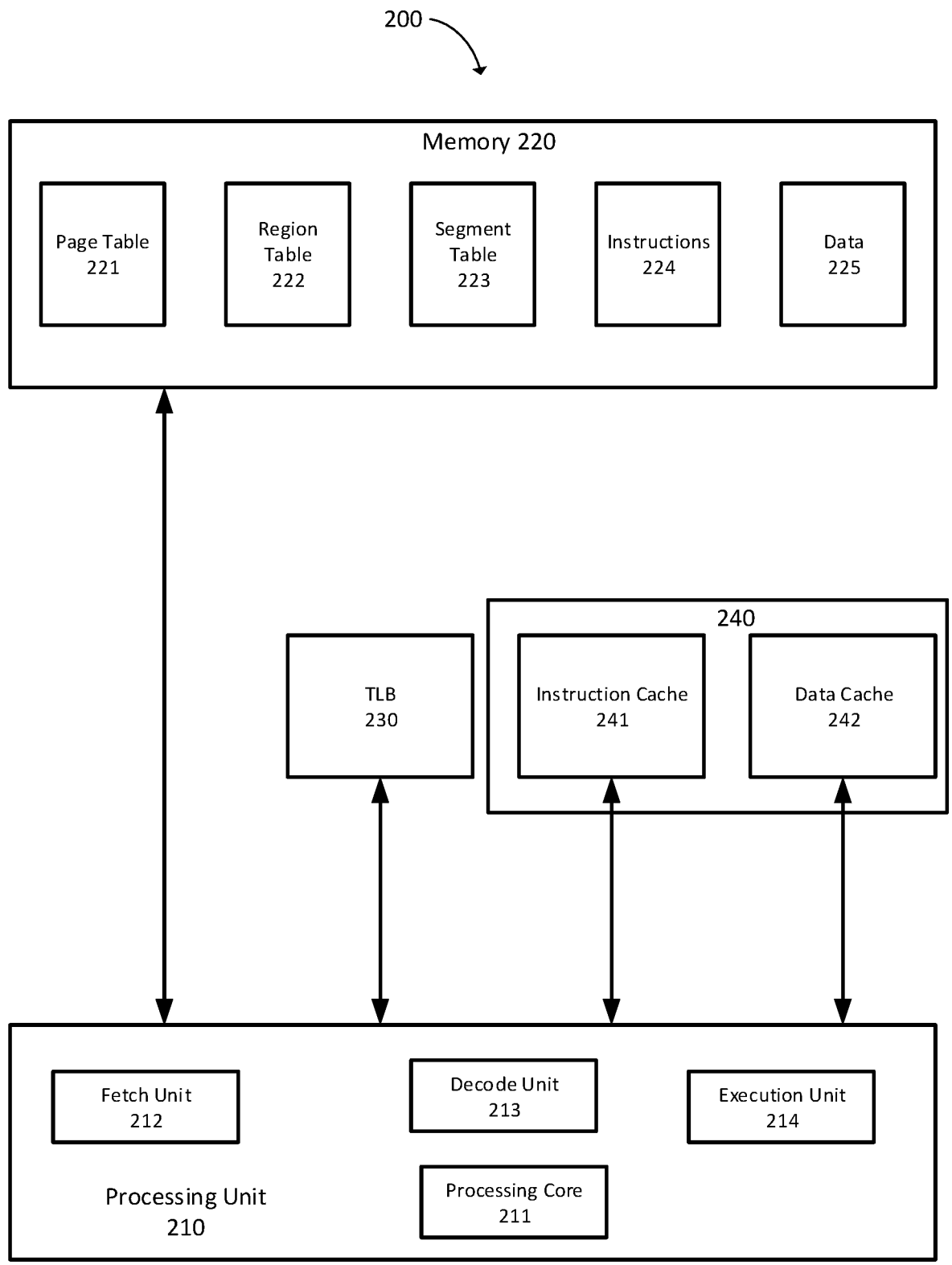
FIG. 2 is a functional block diagram illustrating a processing system within which address translation using parallel TLB lookup for different page sizes may be implemented, according to embodiments of the present disclosure.

FIG. 2 illustrates a block diagram of a processing system 200 that that represents one suitable environment within which address translation using parallel TLB lookup for different page sizes may be implemented. The processing system 200 includes a processing unit 210, memory 220, a translation look-aside buffer 230, and cache memory 240.

The processing unit 210 receives data, such as operand data, and instructions and executes the instructions. The processing unit 210 may include, for example, a processing core 211 including logic and other circuitry for processing data and instructions, a fetch unit 212 configured to fetch instructions, a decode unit 213 configured to decode instructions, and an execution unit 214 configured to execute the instructions. Although a few functional units of the processing unit 210 are illustrated for purposes of description, it is understood that the processing unit 210 may include additional functional units for retrieving, processing, and storing instructions and data.

The processing system 200 further includes memory 220 configured to store tables, such as a page table 221, region table 222, and segment table 223, as well as instructions 224 and data 225 which may be accessed and manipulated by the instructions 224. The page table 221, region table 222, and segment table 223 are collectively described as dynamic address translation (DAT) structures 221, 222, and 223. The memory 220 may include volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cassette or the like, etc.). Moreover, the memory 220 may incorporate electronic, magnetic, optical, and/or other types of storage media. In some embodiments, the memory 220 may have a distributed architecture, where various components are situated remote from one another, but can be accessed by the processor processing unit 210.

Cache memory 240 includes instruction cache 241 and the data cache 242, which store instructions and data, respectively, for quick access by the processing unit 210 during execution of instructions. In operation, the fetch unit 212 fetches an instruction from memory 220 or from the instruction cache 241. The decode unit 213 reads the instruction and determines one or more virtual addresses referenced by the instruction. The decode unit 213 may access the TLB 230 for the virtual-to-real address translation. If the virtual-to-real address translation is not found in the TLB 230, the processing unit 210 may access one or more of the page table 221, region table 222, and segment table 223 to obtain a virtual-to-real address translation, or the processing unit 210 may build a new virtual-to-real address translation. Once a virtual-to-real address translation is built or accessed from one of the page table 221, region table 222, or the segment table 223, the virtual-to-real address translation may be stored in the TLB 230 for quick access. For example, accessing memory 220 by the processing unit 210 may require more operations than accessing the TLB 230, and data transmission times may be slower between the memory 220 and the processing unit 210 than between the TLB 230 and the processing unit 210.

Entries stored in the DAT structures 221, 222, and 223 and in the TLB 230 may include virtual addresses, real addresses corresponding to the virtual addresses, and additional information that categorizes or defines one or more of the virtual address and the real address or provides information to a processing unit about the real address or the virtual address. For example, in some cases an entry may include a status indicator that may be changed to modify a designated status of a corresponding real address. An address storing data may change from a read/write status to a read-only status, or vice versa. In some embodiments, a protect bit may be associated with an address stored in the TLB 230, and changing the state of the protect bit from a 1 to a 0 may alternate the state between making the address read only or read/write.

In some embodiments, subspaces may be partitioned within memory to designate portions of memory as being accessible by only certain programs, or to allow certain programs to only access limited portions of memory. Designating subspaces may involve changing values in the region table 222 and the TLB 230. In other words, each entry in the region table 222 and TLB 230 may include a predetermined number of bits set aside to designate one or more subspaces associated with the entry.

In embodiments of the present disclosure, data access states or other information associated with an address of DAT structures 221, 222, or 223 or entries in a TLB 230 may be changed without invalidating the entries in the DAT structures 221, 222, and 223 or TLB 230. For example, an entry in a DAT structure 221, 222, or 223 or in the TLB 230 may include a validity bit that indicates whether the address translation information is valid or has been changed. In addition, data access states or other information associated with an address of DAT structures 221, 222, or 223 or entries in a TLB 230 may be changed without purging the TLB 230. In the present disclosure and claims, changing data access states, characteristics, or classifications associated with addresses includes modifying information associated with the addresses that does not affect the address itself or the contents at that address. Although examples have been provided above related to read/write access and selective program access by generating subspaces in memory, it is understood that embodiments of the present disclosure encompass any classification, state, or characteristic that may be associated with an address to categorize the address or control access to the address without modifying the address or the contents located at the address.

While FIG. 2 illustrates for purposes of description a processing system 200 including one processing unit 210 one TLB 230 and one memory 210, embodiments of the present disclosure encompass any computing structure, including personal computers, servers, and mainframe computing structures including multiple CPUs.

Figure 3:
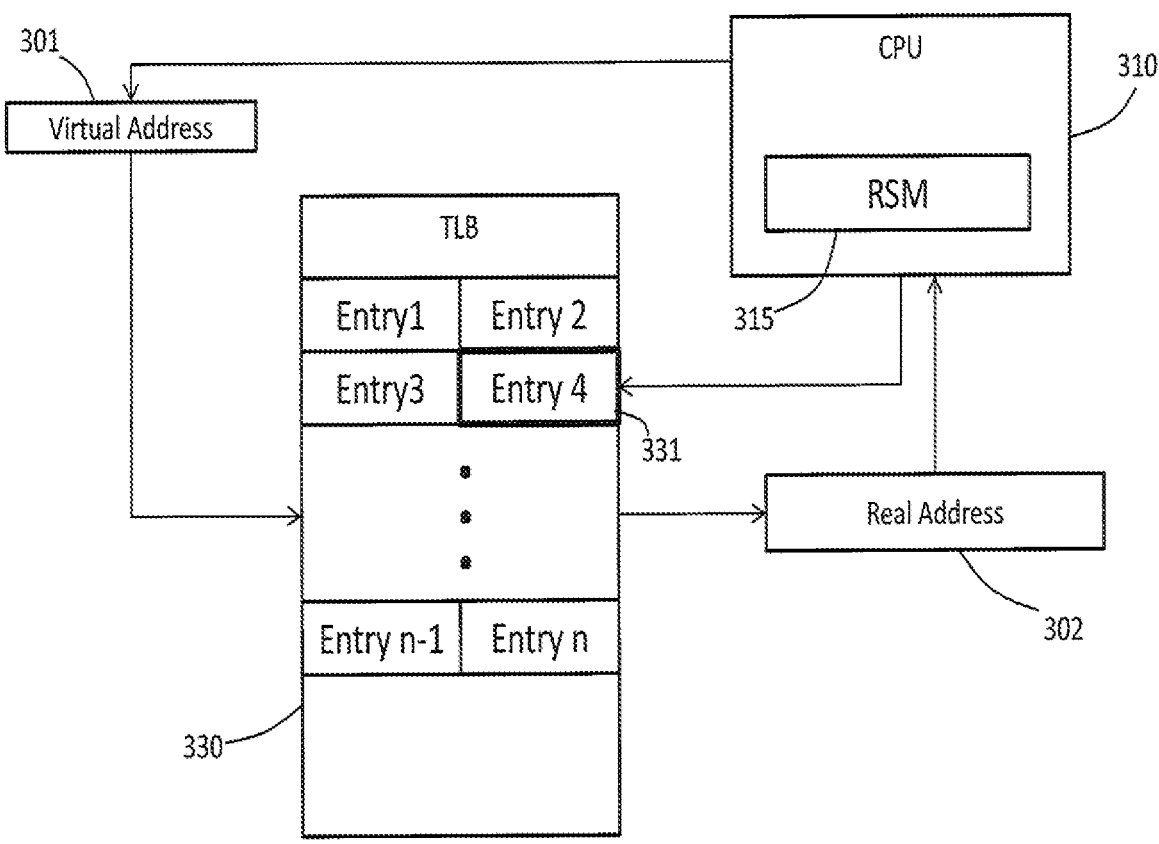
FIG. 3 illustrates a block diagram of a CPU 310 and TLB 330 according to an embodiment of the present disclosure.

FIG. 3 illustrates a block diagram of a CPU 310 and TLB 330 according to an embodiment of the present disclosure. The CPU 310 may correspond to the processing unit 210 of FIG. 2, and the TLB 330 may correspond to the TLB 230 of FIG. 2. The CPU may include a real storage manager (RSM), or the RSM may comprise code executed by the CPU to manage DAT structures, such as DAT structures 221, 222, and 223 of FIG. 2. During normal operation, the CPU 310 references a virtual address 301 during processing of an instruction. The virtual address 301 is sent to the TLB 330 to determine whether a corresponding entry exists in the TLB 330 indicating a real address, or a physical memory location, associated with the virtual address. When such an entry exists, the real address 302 is provided to the CPU 310, along with any additional information in the entry, such as data access information, page size, etc.

The RSM 315 or other program may change information associated with an address of one or more entries of the DAT structures, such as DAT structures 221, 222, and 223 of FIG. 2. For example, a user or program may change a data access setting of an address to indicate that the address may only be used for a particular type of operation, such as a read operation, or by particular programs, so that one program may read and write but another may not read from or write to the address. When the RSM 315 changes the information associated with the address in a DAT structure, the RSM 315 also changes any entries corresponding to the address in the TLB 330. In embodiments of the present disclosure, the RSM 315, or the CPU 310, may modify information associated with the address in an entry 331 of the TLB 330 without invalidating the entry 331 or any other entries and without purging the entry 331 or any other entries. Accordingly, data processing times may be improved, since the TLB 330 need not be re-populated with addresses, and the CPU 310 may quickly access address translations. When the entry does not exist in the TLB 330, the RSM 315 may access the entry in a DAT table or may generate a new address translation to be stored in the DAT table and the TLB 330.

A TLB stores mappings from virtual memory addresses to physical memory addresses by caching entries from a page table. When a program needs to access a memory location, it will reference the location using a virtual address associated with its virtual memory space. The memory subsystem consults the TLB to determine if it stores a mapping for the particular virtual address. If so, the memory subsystem proceeds with the memory operation using the corresponding physical memory address from the TLB. If no entry exists in the TLB for the virtual address, the memory subsystem must consult the page table. Because memory access is frequent and page table lookups are (relatively) time consuming, a high TLB hit rate may result in increased memory subsystem performance. TLBs may support set associative lookups, such that multiple locations within the TLB are accessed in a single operation. For example, a four-way associative TLB accesses four TLB locations at once, while a fully associative TLB accesses all TLB locations at once. In one or more embodiments, the TLB 330 may be a content addressable memory (CAM).

TLB entries generally only map a certain number of bits from a virtual address to a corresponding number of bits in a physical address. The number of bits mapped is a function of the page size associated with the virtual address. For example, for a 4 KB page size, the first 12 bits of the physical address represent an offset within a page, because 12 bits are sufficient to address every memory location within a 4 KB page. In a TLB storing 4 KB page size entries, these first 12 bits are ignored during a lookup, and only higher order bits are used. In a system using 64 bit addressing, the remaining 52 bits of the address would be used in a TLB storing 4 KB page size entries. In another example, for a 1 GB page size, the first 30 bits of the physical address represent an offset within a page, and the remaining 34 bits would be used in a TLB storing 1 GB page size entries. Because TLBs are generally designed for low latency due to the frequency at which TLB lookups are performed, a single conventional TLB is generally designed to handle entries for one page size by configuring it to use a certain number of bits from a virtual address when performing a lookup.

It will be appreciated that the architecture illustrated in FIGS. 1-3 is merely exemplary in nature, and the invention may be utilized in a wide variety of other architectures utilizing address translation.

Figure 4:
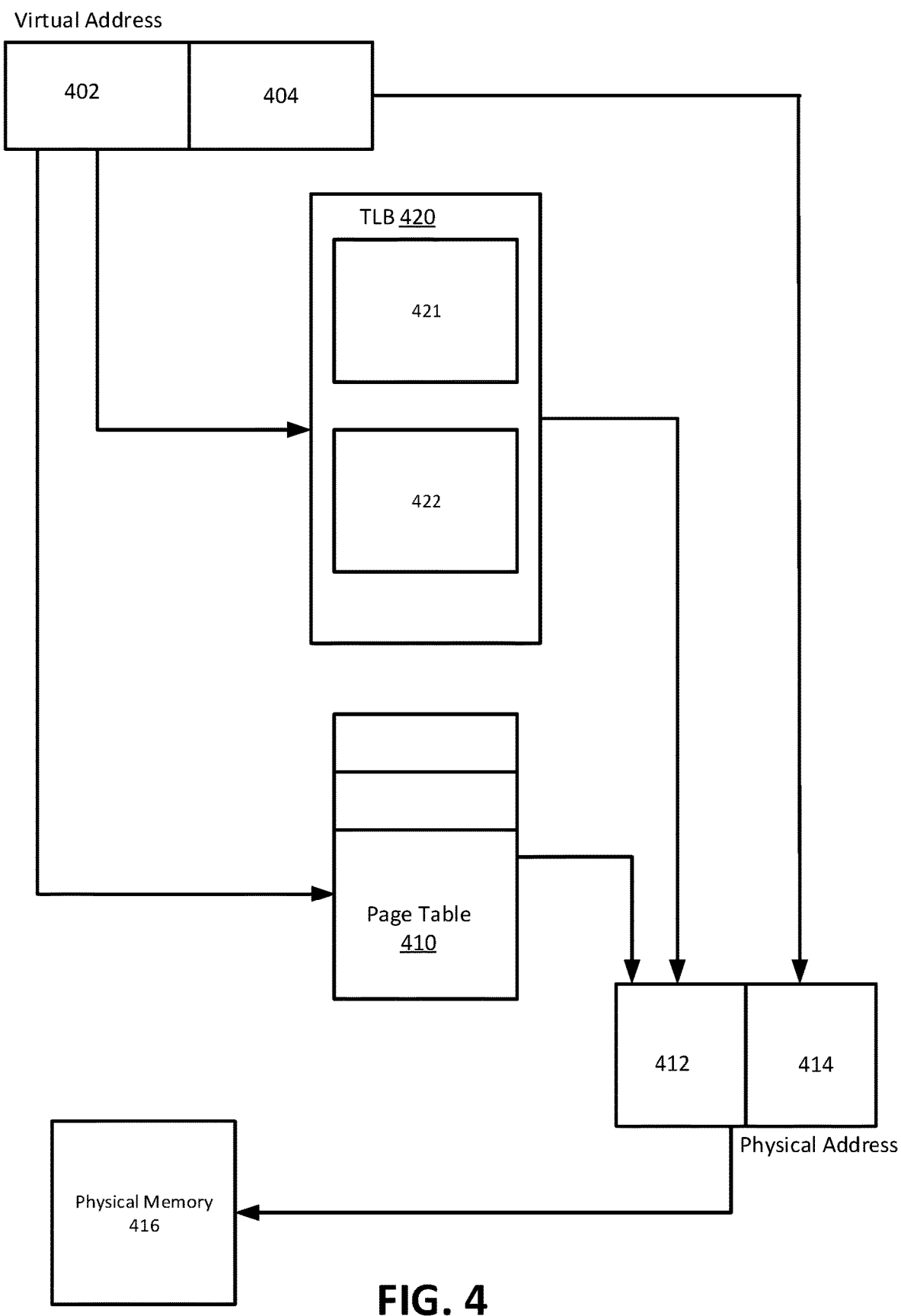
FIG. 4 illustrates a block diagram illustrating a system for resolving virtual addresses using a TLB and a page table, according to embodiments of the present disclosure.

FIG. 4 illustrates a block diagram illustrating a system for resolving virtual addresses using a TLB and a page table, according to the embodiments disclosed herein. As shown in FIG. 4, the virtual address resolution system 400 includes a TLB 420, a page table 410, and a physical memory 416. The TLB 420 is designed to handle entries for two page sizes and includes a first TLB array 421 and a second TLB array 422. In an embodiment, the contents of the two TLB arrays are mutually exclusive i.e. a single PTE can never exist in both arrays simultaneously. The first TLB array 421 and the second TLB array 422 may have an identical structure or arrangement. Optionally, the first TLB array 421 and the second TLB array 422 may not be congruent (for example, their set associativity may be different).

The first TLB array 421 may be configured to perform lookups using the number of significant bits for virtual addresses associated with a first page size when a first bit value (e.g., "1") is provided to it and to perform lookups using the number of significant bits for virtual addresses associated with a second page size when a second bit value (e.g., "0") is provided to it. The second TLB 422 is configured to perform the opposite lookups. Specifically, the second TLB array 422 may be configured to perform lookups using the number of significant bits for virtual addresses associated with a first page size when the second bit value (e.g., "0") is provided to it and to perform lookups using the number of significant bits for virtual addresses associated with a second page size when the second bit value (e.g., "1") is provided to it. In an embodiment, the page size pairs (one or more) to be searched in the two TLB arrays simultaneously, and their corresponding bit values are assigned when the TLB is initialized or set up in order to ensure that the location of a single PTE in the TLB is deterministically known.

During translation, both the arrays are searched simultaneously for a match by associating the first TLB array 421 and the second TLB array 422 with a different page size (from a first page size pair) as described below with respect to FIGS. 5-8. The first TLB array 421 and the second TLB array 422 may be arranged in any now or hereafter known format (e.g., an N-way set associative TLB array, fully associative TLB array, or the like). It will be understood to those skilled in the art that the TLB 420 can be any level TLB during address translation (with the initial levels including faster matching logic compared to those of the later level TLBs). A variety of indexing schemes, known to those of ordinary skill in the art, may be used for TLB indexes.

As shown in FIG. 4, a virtual address includes effective address bits 402 and an offset 404. The effective address bits 402 are transmitted to the TLB 420, which attempts to match the effective address bits 402 with a virtual page number (not shown) stored in the TLB 420. The TLB 420 may execute the matching logic in first TLB 421 and the second TLB array 422 simultaneously by associating the first TLB array 421 with a first page size supported by the processing system and the second TLB array 421 with a second page size supported by the processing system, as described below in FIGS. 5-8. If the TLB 420 finds an entry containing a virtual page number matching the effective address bits 402 in either the first TLB array 421 or the second TLB array 422, it provides a page frame number 412 corresponding to the effective address bits 402.

However, if the TLB 420 cannot find an entry containing a virtual address matching the effective address bits 402, and more page sizes are supported by the processing system; the TLB 420 may execute the matching logic simultaneously again for a different page size pair, as discussed above. Hence, the system may execute the matching logic for all possible page sizes by performing the lookups in TLB 420 for different page sizes in a pairwise manner, till either an entry is found or till a TLB miss is returned (where the page size pairs and their corresponding bit values for each TLB array are defined during initialization of the TLB, i.e., before the search).

In one embodiment, if a match is not found for any of the page sizes, the virtual address resolution system 400 fetches the corresponding page frame number 412 from the page table 410 (e.g., by performing a page walk after a TLB miss). The virtual address resolution system 400 may also load the fetched page frame number 412 into one or both of the TLB arrays. Once the page frame number 412 is fetched from either of the TLBs or the page table 410, it is combined with the offset 414 to form a physical address. As shown in FIG. 4, the page frame number 412 is used to address a page in the physical memory 416. The offset 414 is used to access and address relative to the beginning of the page.

The matching operations are performed in parallel to minimize delays associated with resolving virtual addresses. Hence, the bandwidth for TLB translation is doubled using the systems and methods described herein and the TLB can accommodate twice the number of translations in the same amount of time. For example, if a processing system supports page sizes of 4 KB, 64 KB, 2 MB, and 1 GB, the bandwidth for TLB translation may be doubled by executing the matching logic for 2 page sizes (any pair combination) at the same time (i.e., in 2 cycles), compared to conventional TLB array designs and matching algorithms that would execute the matching logic for each page size in 4 subsequent cycles. This also leads to a reduction in TLB hit latency because the page sizes that were looked up later in the conventional methods can be looked up sooner. Finally, table walk initiation latency is also reduce because it would take less time to conclude a TLB miss on all possible page sizes using the systems and methods described in this disclosure.

While the TLB design and methods of this disclosure improve the bandwidth for TLB translation, and reduce the TLB hit latency and the table walk initiation latency, the effective size of the TLB is maintained. The reason is that while including two TLB arrays in the same TLB doubles the TLB size (compared to when one TLB is designated for each page size), two different page sizes can be associated with each array in the TLB of the current disclosure without losing the throughput of the one TLB designation for each page size design. For example, consider a conventional TLB that includes a first TLB array that caches all 64 KB PTEs and a second TLB array that caches all 4 KB PTEs. While the two arrays can be accessed in parallel because the location of the page size is known and the two arrays are two individually indexed entities, it does not address efficiency issues that may arise when the operating system chooses all page sizes to be the same (e.g., if the operating system chooses all page sizes to be 64 KB, the processor will waste possible efficiency gains because of the unutilized 4 KB PTE array). The methods and systems of this disclosure solve this problem because every time a page size pair flips the value of the reference LSB bit, the caching is rotated to the other array. For example, in the above example of 4 KB and 64 KB page sizes, should the operating system choose all 64 KB pages, then every other 64 KB region of memory will be distributed among the two arrays. On the other hand, if the operating system chooses all 4 KB pages, then all 4 KB pages within a single 64 KB region of memory will be stored in the first array, and all 4 KB pages within the next 64 KB region of memory will be stored in the other array. Thus, independently of what page size the operating system chooses, the hardware can cache both efficiently while still maintaining a fast TLB lookup.

Figure 5:
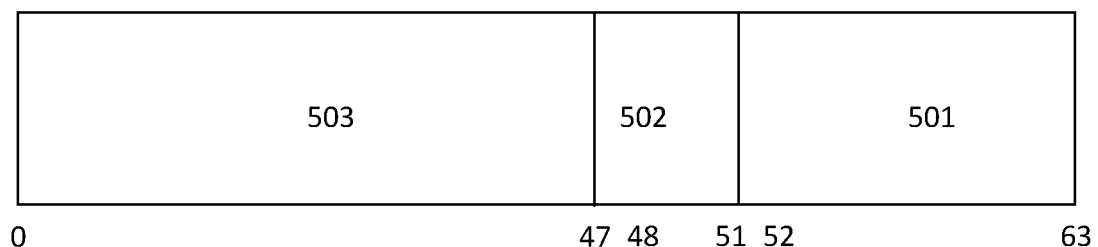
FIG. 5 illustrates the portions of a virtual address for use in translation.
Figure 5:
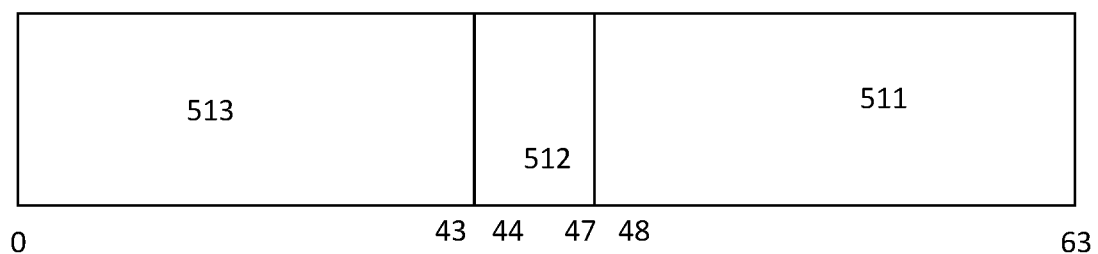

As shown in FIG. 5, fewer bits of a virtual address are needed to address the larger size pages as compared to the number of bits needed to address smaller size pages in the memory for a given pair of different size pages (since fewer large pages are required to accommodate and address a given amount of data compared to the number of small pages). In particular, virtual addresses are often partitioned for the purposes of address translation into offset bits and effective address bits, with the offset bits pointing to a specific address in a page. The effective address bits or the effective page number may include the tag and set-index bits (for an n-way set associative TLB). The index provides for indexing into sixteen entries of each way of TLB tag array (4-way set associative TLB with sixteen (16) tag entries per way). The tag provides the tag address that is compared with the indexed tag entry from each way of TLB tag array.

Assume for example, that a system implementing a single TLB for multiple page sizes uses 4 KB small pages and 64 KB large pages. Assume, as an example, a 64 bit memory addressing system in use in such a system. For a 4 KB page, 12 offset bits are required to address every location in a page, while for a 64 KB page, 16 offset bits are required. The effective address bits, which are typically the higher order bits from the offset bits, are then used to identify the page, and thus, the effective address bits are used to access address translation data structures such as TLB's. As shown in FIG. 5, a virtual address 500 can represent an address for a 4 KB page or for a 64 KB page. For a 16-set 4 KB TLB array (4-way set associative TLB with sixteen (15) tag entries per way), the offset bits 501 would be [52:63], the set-bits 502 would be [48:51], and the tag bits 503 would be [0:47]. In contrast, for a 16-set 64 KB TLB array, the offset bits 511 would be [48:63], the set bits 512 would be [44:47], and the tag bits 513 would be [0:43] (a larger offset would logically be required to address the larger page size). Hence, as shown in FIG. 5 effective address bits for one page size can be page offset bits for another page size. If page-offset bits are used as a TLB-index/tag, a translation for a single page could reside in multiple TLB (s) depending on the part of the page being accessed (i.e., the page offset).

The TLB 420 shown in FIG. 4 of the current disclosure addresses the above issue by associating and configuring each TLB array with a page size at the time of translation as described below with respect to FIG. 6.

Figure 6:
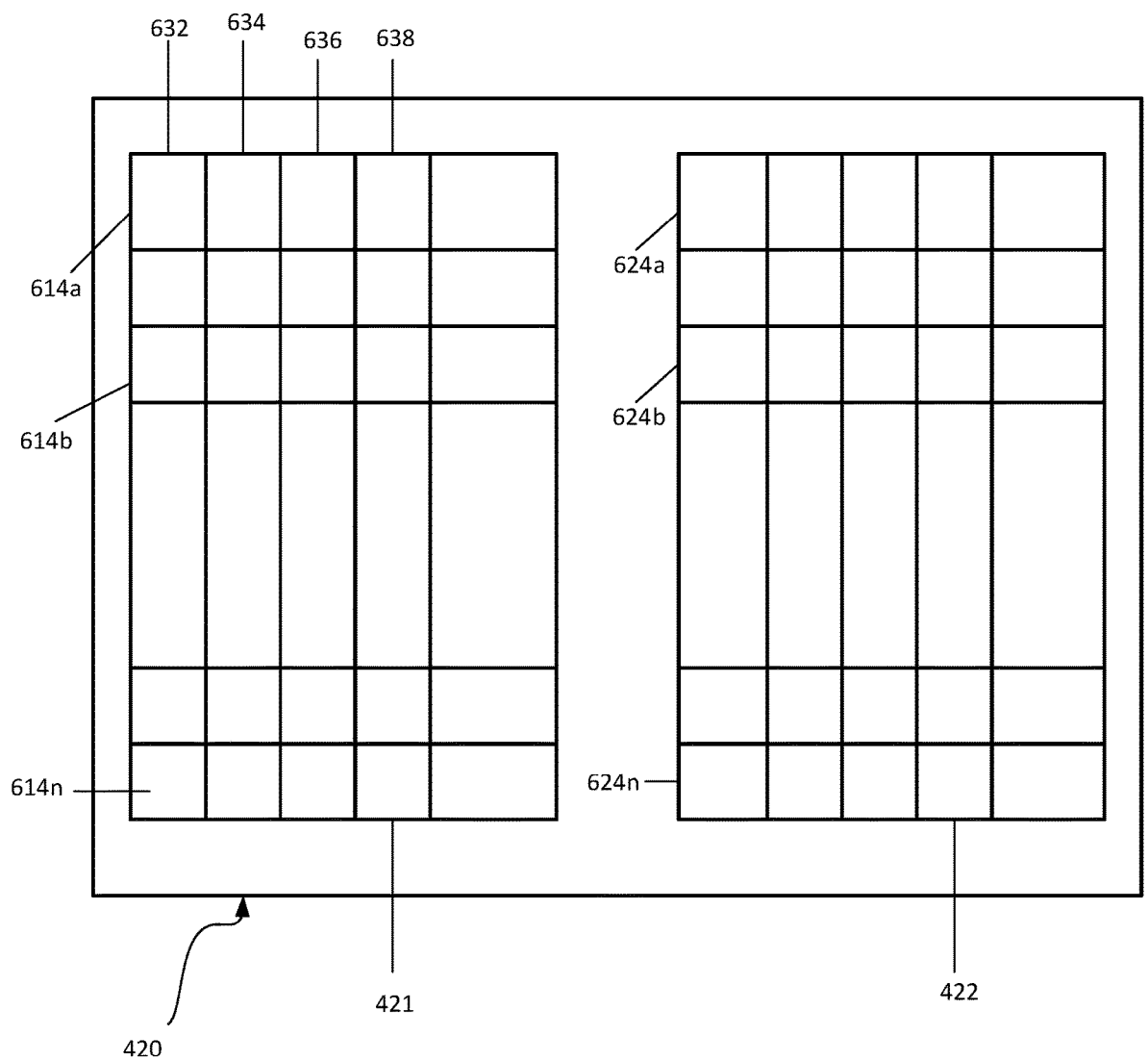
FIG. 6 illustrates a block diagram of an example TLB design according to embodiments of the present disclosure.

FIG. 6 illustrates an exemplary of TLB design for TLB 420 according to an embodiment of the present disclosure that is configured for performing parallel lookups for two different page sizes. As shown in FIG. 6, TLB 420 includes two TLB arrays 421 and 422, each including multiple columns and rows. Each row in an array (614a-n in array 421, and 624a-n in array 422) represents an entry to map virtual addresses to physical addresses.

Referring to exemplary array 421, each entry may include a virtual address 632 and an associated real address 634. The entry may also include additional information, such as a page size 636 and data access information 638. Examples of data access information 638 include data access levels, such as limiting data access to read-only or allowing read operations and write operations, and subspace information, which defines programs that may access the real address 634. Although some examples of additional information are provided by way of example, embodiments of the present disclosure encompass any additional information stored in an entry of a TLB array, where the additional information is not the virtual address or the real address. TLB array 422 will include similar columns.

In an embodiment, for performing parallel lookups for two different page sizes simultaneously, each array in the TLB 420 (array 421 and array 422) is associated with one of two page sizes during translation based on a received bit value (discussed below), and is then configured to perform lookup for that page size using the appropriate number of bits taken from the virtual address. The association is done by providing to each TLB array the value of the least significant bit (LSB) of the effective address bits extracted from the received virtual address assuming that the virtual address is for the larger of the two different page sizes being considered.

As discussed above, during set-up, the first TLB array 421 is configured to perform lookups for a larger page size if the LSB value is I and to perform lookups for a smaller page size if the LSB for value is O (or vice versa). The opposite values are associated with the second TLB array 422 (i.e., a bit value of O corresponding to a larger page size and a bit value of I corresponding to a smaller page size in the above example). Hence, when the value of the extracted LSB is 1, first TLB array 421 uses effective address bits corresponding to the larger page size for performing lookups, and the second TLB array 422 uses effective address bits corresponding to the smaller page size for performing lookups. However, when the value of the extracted LSB is 0, first TLB array 421 uses effective address bits corresponding to the smaller page size for performing lookups, and the second TLB array 422 uses effective address bits corresponding to the larger page size for performing lookups.

Since the LSB value extracted from an effective address for a larger size page does not form part of the translated real address (i.e., it is not a part of the offset) for either the small page size or the large page size, the value remains the same for both page sizes. Therefore, execution of the matching logic always selects the same entry for the two page sizes (after selection of the appropriate TLB array) and always goes to the same location in the TLB considered as a whole.

In an exemplary embodiment, the TLB arrays may be configured for particular page sizes using any suitable methods such as, without limitation, transistor switches whose states may be configured based on the value of the least significant bit and/or the TLB design, or the like. In an exemplary embodiment, configuring a TLB array includes updating one or more transistor switches associated with the TLB array to connect input locations associated with the lower-order bits to TLB array lookup circuitry. Configuring the TLB array may also include updating the one or more transistor switches associated with the TLB array to connect input locations associated with the lower-order bits for inclusion in the physical address. For example, the transistor switch states may be configured to pass on a predefined number of bits from the virtual address to each TLB array. For example, for a 4 KB page, with a 64-bit virtual address (OxFFFFFFFFFFFF123), the transistor switches may be configured such that the last 12 bits of the virtual address (Ox123) are directly included in the physical address, and the remaining 52 bits of the virtual address are passed to the appropriate TLB and used to retrieve the corresponding bits of an associated physical address (OxBBBBBBBBBBBBBB).

Alternatively, the TLB 420 may receive both effective addresses and may pass on the appropriate effective address to the TLB arrays based on the value of the LSB.

Referring back to the issues discussed with respect to FIG. 5, based on the LSB value received by the TLB 420, the two TLB arrays (array 421 and array 422) are configured to use a different number of effective address bits to perform looks. In the example of FIG. 5, where a 64 bit memory addressing system implemented for a system using 4 KB and 64 KB pages, the LSB of the effective address bits corresponding to the larger page size (i.e., 64 KB page) would be bit 47 of the virtual address. The TLB 420 may then designate and configure one of the two TLB arrays for the 4 KB page, and the other one for the 64 KB page based on the value of bit 47, for executing the matching logic.

Figure 7:
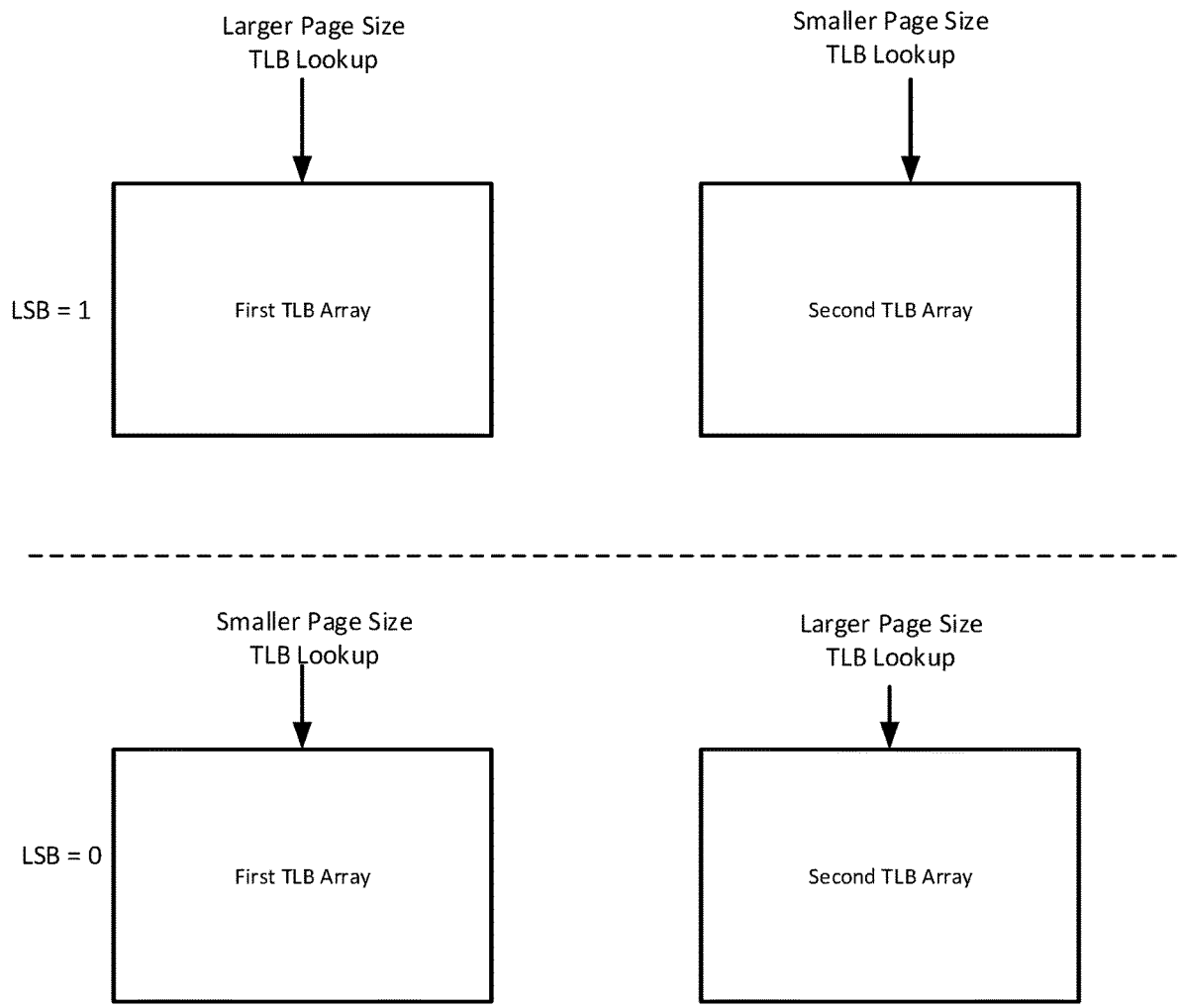
FIG. 7 illustrates a schematic example implementation of address translation using parallel TLB lookup for different page sizes according to embodiments of the present disclosure.

For example, if during set-up, the first TLB array 421 is associated with a bit value of 1 corresponding to a larger page size and the bit value of bit 47 is 1, the 64 KB page is associated with the first TLB array 421 by configuring it to use bits 0-47 during lookups, and the 4 KB page is associated with the second TLB array 422 by configuring it to use bits 0-51 during lookups, as shown in FIG. 7. Hence, a first effective address (i.e., bits 0-47 corresponding to the 64 KB page) will be used by the matching logic in the first TLB array 421 and the second effective address (i.e., bits 0-51 corresponding to the 4 KB page) will be used by the matching logic in the first TLB array 422. On the other hand, in the above TLB design, if the bit value of bit 47 is 0, the 4 KB page is associated with the first TLB array 421 by configuring it to use bits 0-51 during lookups, and the 64 KB page is associated with the second TLB array 422 by configuring it to use bits 0-47 during lookups, as shown in FIG. 7. Hence, a first effective address (i.e., bits 0-51 corresponding to the 4 KB page) will be used by the matching logic in the first TLB array 421 and the second effective address (i.e., bits 0-47 corresponding to the 64 KB page) will be used by the matching logic in the second TLB array 422.

While the above TLB design description focuses on the use of two particular page sizes, 4 KB (small page size) and 64 KB (large page size), the underlying principles of the current disclosure may be implemented using any pair of page sizes. For example, the underlying principles of the combination may be used with any combination of different page sizes by identifying the value of the least significant bit in the effective address corresponding to the larger page size of the pair. Table I below illustrates the least significant bit number for the effective address for different page sizes:

TABLE 1

| Page Size | Log2 (page size) | Effective address bits (for a 64-bit address) | Least significant bit |
|---|---|---|---|
| 4 KB = 21\12 byte | 12 | 52 = 64 − 12 (0:51) | 51 |
| 16 KB = 21'14 byte | 14 | 50 = 64 − 14 (0:49) | 49 |
| 64 KB = 21'16 byte | 16 | 48 = 64 − 16 (0:47) | 47 |
| 1 MB = 21'20 byte | 20 | 44 = 64 − 20 (0:43) | 43 |
| 16 MB = 21'24 byte | 24 | 40 = 64 − 24 (0:39) | 39 |
| 1 GB = 21'30 byte | 30 | 34 = 64 − 30 (0:33) | 33 |

Figure 8:
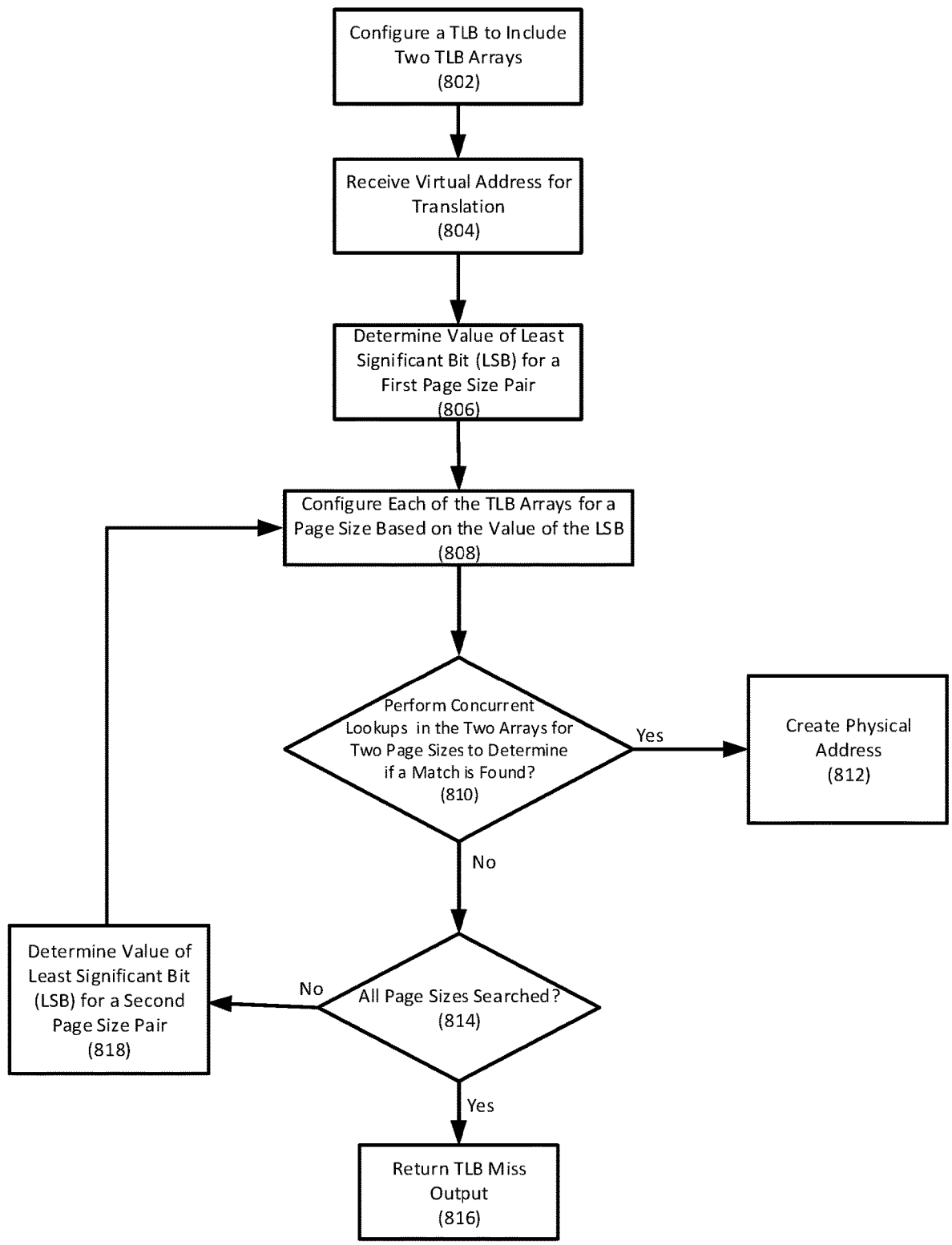
FIG. 8 is an exemplary flowchart illustrating and describing a method of performing parallel lookups for different page sizes according to embodiments of the present disclosure.

FIG. 8 is an exemplary flowchart in accordance with various embodiments illustrating and describing a method of performing parallel lookups for different page sizes, and more specifically a method of decreasing latency in address translations in a processor, utilizing the TLB design described in FIGS. 4 and 6. While the method 800 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 8 but the process may be integrated and/or one or more steps may be performed together, simultaneously, or the steps may be performed in the order disclosed or in an alternate order.

At step 802, the system may configure a TLB including two TLB arrays as described above with respect to FIGS. 4 and 6. During configuration, the TLB may be configured to perform PTE lookups in a pairwise manner for one or more page sizes (e.g., 4 KB and 64 KB, or any other suitable combination of page sizes) supported by the processing system. For example, if the processing system supports four page sizes of 4 KB, 64 KB, 1 MB, and 1 GB; the TLB may be configured to perform simultaneous lookups for two page sizes in a first pair, followed by simultaneous lookups for two remaining page sizes in a second pair; until a PTE is found or a TLB miss is returned. In an embodiment, the pairs of page sizes are defined during configuration or initialization of the TLB. Furthermore, a rule set is defined for configuring each of the TLB arrays based on the bit value of the LSB of an effective address corresponding to the larger page size of each pair of page sizes. For example, the rule set may define that a first TLB array must be configured to perform lookups for the larger page size if the LSB value is 1 and to perform lookups for the smaller page size if the LSB value is O (or vice versa). The rule set may define that the opposite values are associated with a second TLB array (i.e., a bit value of either O corresponding to a larger page size and a bit value of either 1 corresponding to a smaller page size in the above example).

At 804, the system may receive a virtual address for translation, and may determine (806) the value of the LSB of an effective address corresponding to the larger of the two page sizes of a first pair associated with the TLB. For example, if a first pair of pages sizes associated with the TLB includes 4 KB and 64 KB page sizes, the system may determine the value of bit 47 of the virtual address.

At 808, the system may configure each of the two TLB arrays for one of the two page sizes based on the value of the bit (e.g., bit 47) and the rule set. At 810, the system may then perform lookups for the two page sizes in parallel (or concurrently) using the appropriate number of effective address bits for each of the two TLB arrays to determine if there is a match for the effective address bits. For example, for the above rule set, when the value of the extracted LSB is 1, the first TLB array uses effective address bits corresponding to the larger page size for performing lookups, and the second TLB array uses effective address bits corresponding to the smaller page size for performing lookups. However, when the value of the extracted LSB is 0, the first TLB array uses the effective address bits corresponding to the smaller page size for performing lookups, and the second TLB array uses the effective address bits corresponding to the smaller page size for performing lookups.

If a match is found (810: YES), the system may use the page frame number from the matching entry to create a physical address (812). However, if a match is not found (810: NO), the system may determine if all page sizes supported by the processing system have been searched (814). If all possible page sizes have not been searched (814: NO), the system may determine (818) the value of a LSB of an effective address corresponding to the larger of the two page sizes of a second pair associated with the TLB. The system then repeats steps 808-812 for the second pair of page sizes associated with the TLB. And, if all the page sizes have been searched (814: YES), the system reports a TLB miss at 816.

While the illustrative embodiments described above are preferably implemented in hardware, such as in units and circuitry of a processor, various aspects of the illustrative embodiments may be implemented in software as well. For example, it will be understood that each block of the flowchart illustrations in FIG. 8, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing system comprising:
   a translation lookaside buffer (TLB) configured to store a plurality of entries, each entry comprising virtual address information and real address information associated with the virtual address information, wherein the TLB comprises a first TLB array and a second TLB array; and
   a processor,
   wherein the system is configured to:
   receive a first virtual address for translation to a real address,
   determine, based on a first portion of the first virtual address and a second portion of the first virtual address, if the TLB has stored the real address associated with the first virtual address, wherein the first portion is associated with a first page size and the second portion is associated with a second page size that is different from the first page size, and
   use the first portion for performing a lookup in either one of the first TLB array and the second TLB array and use the second portion for performing a lookup in the other one of the first TLB array and the second TLB array.

2. The computing system of claim 1, wherein the system is further configured to:
   before receiving the first virtual address, configure the TLB to include the first TLB array and the second TLB array;
   extract, based on a page size of a larger of the first page size and the second page size, a least significant bit (LSB) of effective address bits from the received virtual address; and
   define a rule set for associating the first page size with the first TLB array or the second TLB array and for associating the second page size with the first TLB array or the second TLB array during translation based on a value of the LSB in the received first virtual address.

3. The computing system of claim 2, further configured to determine the value of the LSB in the first virtual address.

4. The computing system of claim 3, further configured to, before the determination step, use the rule set for associating the first page size with either the first TLB array or the second TLB array and associating the second page size with the other one of the first TLB array or the second TLB array based on the value of the LSB in the first virtual address.

5. The computing system of claim 4, further configured to configure the first TLB array and the second TLB array to use a portion of the first virtual address for performing a lookup based on a size of the associated page.

6. The computing system of claim 2, wherein the value of the LSB is either 0 or 1.

7. The computing system of claim 2, wherein the rule set includes one or more of the following rules:
   if the value of the LSB is 1, associate the larger of the first page size and the second page size with the first TLB array, and the smaller of the first page size and the second page size with the second TLB array;
   if the value of the LSB is 0, associate the larger of the first page size and the second page size with the second TLB array, and the smaller of the first page size and the second page size with the first TLB array;
   if the value of the LSB is 1, associate the smaller of the first page size and the second page size with the first TLB array, and the larger of the first page size and the second page size with the second TLB array; and if the value of the LSB is 0, associate the smaller of the first page size and the second page size with the second TLB array, and the larger of the first page size and the second page size with the first TLB array.

8. The computing system of claim 1, further configured to, in response to determining that the TLB has stored the physical address associated with the first virtual address, use an offset portion of the first virtual address to form a real address.

9. The computing system of claim 1, further configured to:
in response to determining that the TLB has not stored the real address associated with the first virtual address, determine if page sizes other than the first page size and the second page size are supported by the processing system; and if page sizes other than the first page size and the second page size are not supported by the processing system, return a TLB miss output.

10. The computing system of claim 9, further configured to, in response to determining that page sizes other than the first page size and the second page size are supported by the processing system, determine, based on a third portion of the first virtual address and a fourth portion of the first virtual address, if the TLB stores the physical address associated with the first virtual address, wherein the third portion is associated with a third page size and the fourth portion is associated with a fourth page size.

11. The computing system of claim 10, further configured to:
extract, based on a page size of a larger of the third page size and the fourth page size, a least significant bit (LSB) of effective address bits from the first virtual address; and define a rule set for associating the third page size with the third TLB array or the fourth TLB array and for associating the fourth page size with the third TLB array or the fourth TLB array during translation based on a value of the LSB in the received first virtual address.

12. The computing system of claim 1, wherein the first page size and the second page size are selected from the group consisting of: 4 KB, 16 KB, 64 KB, 1 MB, 16 MB, and 1 GB.

13. A method of performing memory address translations in a processor, the method comprising, by the processor:
configuring a translation lookaside buffer (TLB) to include at least a first TLB array and a second TLB array, the first TLB array having a plurality of entries where each first TLB array entry stores address translations for a first page size and the second TLB array having a plurality of entries where each second TLB entry stores address translations for a second page size that is different than the first page size;

receiving a first virtual address for translation to a real address, wherein the first virtual address has a first portion associated with the first page size and a second portion associated with the second page size;

performing, by using the first portion of the first virtual address, a lookup in either one of the first TLB array and the second TLB array; and performing, by using the second portion of the virtual address, a lookup in the other one of the first TLB array and the second TLB array;

determining, based upon a lookup in the first TLB array and the second TLB array, whether there is a matching entry in the first or second TLB array; and in response to there being a matching entry in the first or second TLB array, provide information from the matching entry, and in response to there not being a matching entry in the first or second TLB array, determine if all page sizes supported by the TLB have been searched.

14. The method of claim 13, wherein the lookup using the first portion of the first virtual address is performed concurrently with the lookup using the second portion of the first virtual address.

15. The method of claim 13, further comprising:
before receiving the first virtual address, configuring the TLB to include the first TLB array and the second TLB array;

determining a value of a least significant bit (LSB) associated with the received first virtual address; and defining a rule set for associating the first page size with the first TLB array or the second TLB array and for associating the second page size with the first TLB array or the second TLB array during translation based on the value of the LSB associated with the received first virtual address.

16. The method of claim 15, wherein determining the value of the LSB associated with the received first virtual address includes extracting effective address bits from the received first virtual address and identifying the LSB of the extracted effective address bits.

17. The method of claim 15, further comprising, before the determination step, using the rule set for associating the first page size with either the first TLB array or the second TLB array and associating the second page size with the other one of the first TLB array or the second TLB array based on the value of the LSB associated with the first received virtual address.

18. The method of claim 13, further comprising configuring the first TLB array and the second TLB array for using a portion of the first virtual address for performing the lookups based on a size of the associated page.

19. The method of claim 14, wherein the rule set includes one or more of the following rules:
if the value of the LSB is 1, associate the larger of the first page size and the second page size with the first TLB array, and the smaller of the first page size and the second page size with the second TLB array;

if the value of the LSB is 0, associate the larger of the first page size and the second page size with the second TLB array, and the smaller of the first page size and the second page size with the first TLB array;

if the value of the LSB is 1, associate the smaller of the first page size and the second page size with the first TLB array, and the larger of the first page size and the second page size with the second TLB array; and if the value of the LSB is 0, associate the smaller of the first page size and the second page size with the second TLB array, and the larger of the first page size and the second page size with the first TLB array.

20. The method of claim 13, further comprising:
in response to determining that the TLB does not support page sizes other than the first page size and the second page size, returning a TLB miss output; and in response to determining that page sizes other than the first page size and the second page size are supported by the TLB, determining, based on a third portion of the first virtual address and a fourth portion of the first virtual address, if the TLB stores information associated with the received first virtual address, wherein the third portion is associated with a third page size and the fourth portion is associated with a fourth page size.

* * * * *